United States Patent [19]

Folkman

[11] Patent Number: 5,333,650
[45] Date of Patent: Aug. 2, 1994

[54] HOSE COUPLING WITH A STIFFENING SLEEVE

[75] Inventor: Alex Folkman, Brooklyn, N.Y.

[73] Assignee: Flexon Industries Corporation, Newark, N.J.

[21] Appl. No.: 32,676

[22] Filed: Mar. 17, 1993

[51] Int. Cl.$^5$ .............................. F16L 47/00; F16L 9/16
[52] U.S. Cl. .................................... 138/109; 138/103; 138/121; 138/110; 285/284
[58] Field of Search ............... 138/109, 110, 121, 122, 138/103; 285/284, 286, 288, 291, 292, 297

[56] References Cited

U.S. PATENT DOCUMENTS

| | | | |
|---|---|---|---|
| 1,381,244 | 6/1921 | Shallenberger | 138/110 |
| 1,504,945 | 8/1924 | Dempsey et al. | 138/110 |
| 2,236,731 | 4/1941 | Oberly | 138/110 |
| 2,366,067 | 12/1944 | Smith . | |
| 2,776,151 | 1/1957 | Harkenrider . | |
| 3,263,519 | 8/1966 | Conrad | 138/109 |
| 3,263,520 | 8/1966 | Tschanz | 138/109 |
| 3,388,705 | 6/1968 | Grosshandler | 138/109 |
| 3,502,561 | 7/1970 | Rininger | 138/109 |
| 3,531,143 | 9/1970 | Horvath et al. . | |
| 3,540,223 | 11/1970 | Ebbe | 138/109 |
| 3,661,670 | 5/1972 | Pierpont | 138/109 |
| 4,017,103 | 4/1977 | Lorkowski . | |
| 4,035,002 | 4/1977 | Curtin . | |
| 4,088,156 | 5/1978 | Kubo et al. | 138/109 |
| 4,133,312 | 1/1979 | Burd | 138/109 |
| 4,415,389 | 11/1983 | Medford et al. | 138/109 |
| 4,439,188 | 3/1984 | Demmehey et al. | 138/109 |
| 4,517,404 | 5/1985 | Hughes et al. | 138/109 |
| 4,603,888 | 8/1986 | Goodall et al. . | |
| 4,653,542 | 3/1987 | Tascher | 138/109 |
| 4,658,326 | 4/1987 | Clark et al. . | |
| 4,735,442 | 4/1988 | Bürli . | |
| 4,804,019 | 2/1989 | Kramer | 138/109 |
| 5,160,688 | 11/1992 | Hockett . | |
| 5,181,750 | 1/1993 | Reum . | |

FOREIGN PATENT DOCUMENTS 3299 of 1885 United Kingdom ............... 138/109

Primary Examiner—James E. Bryant, III
Attorney, Agent, or Firm—Ostrolenk, Faber, Gerb & Soffen

[57] ABSTRACT

A hose coupling for being attached to one end of a hose comprising a coupling portion for joining the hose coupling to another mateable coupling, and a generally tubular sleeve portion extending rearward from the coupling portion along the outer surface of the hose to discourage bending of the hose along a predetermined distance adjacent to the coupling portion. In one embodiment, both the coupling portion and the tubular sleeve portion are simultaneously molded onto the end of the hose. In another embodiment, a coupling portion is first attached to the hose end by crimping and the tubular sleeve portion then molded onto the outer crimped portion of the coupling portion.

5 Claims, 3 Drawing Sheets

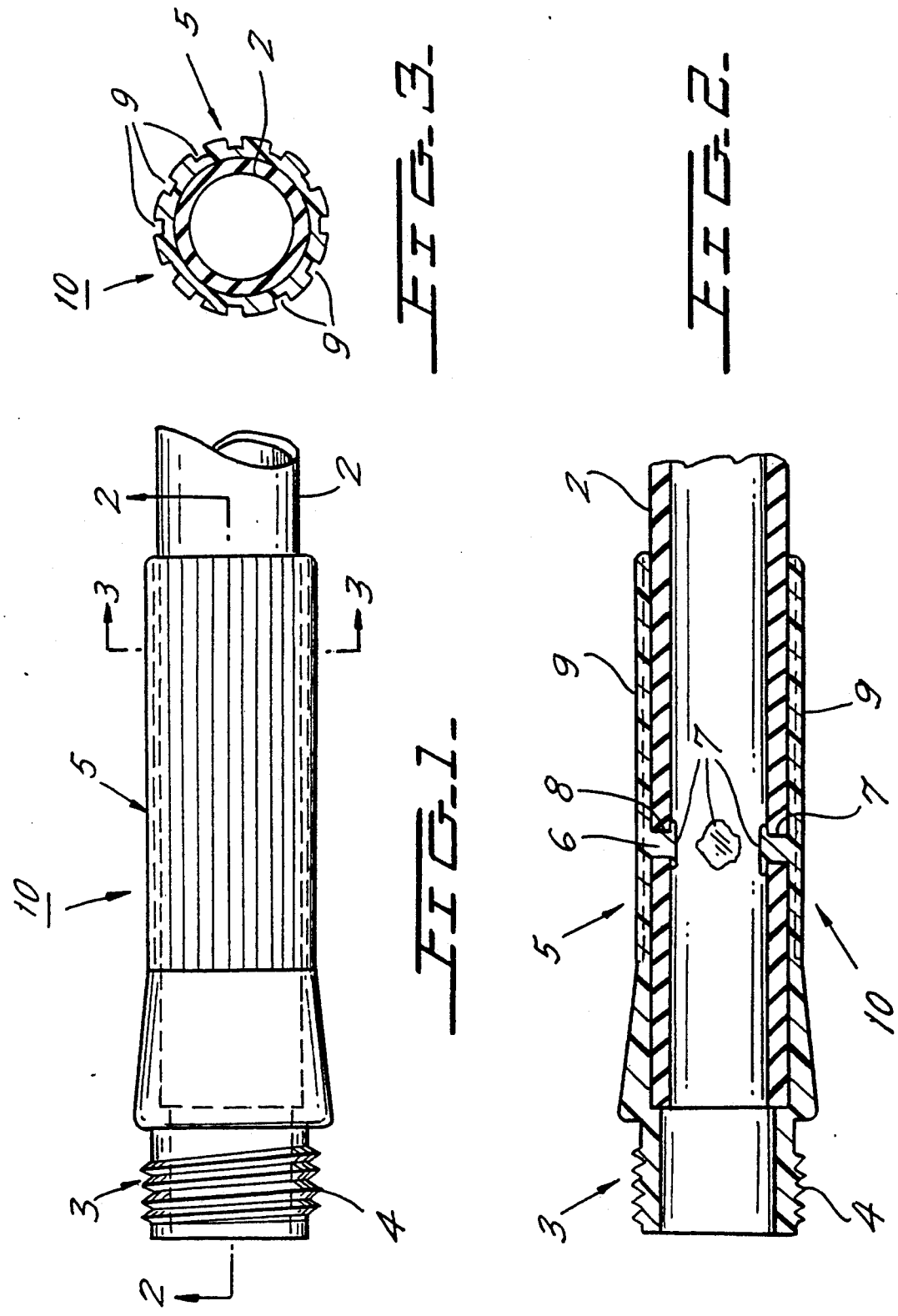

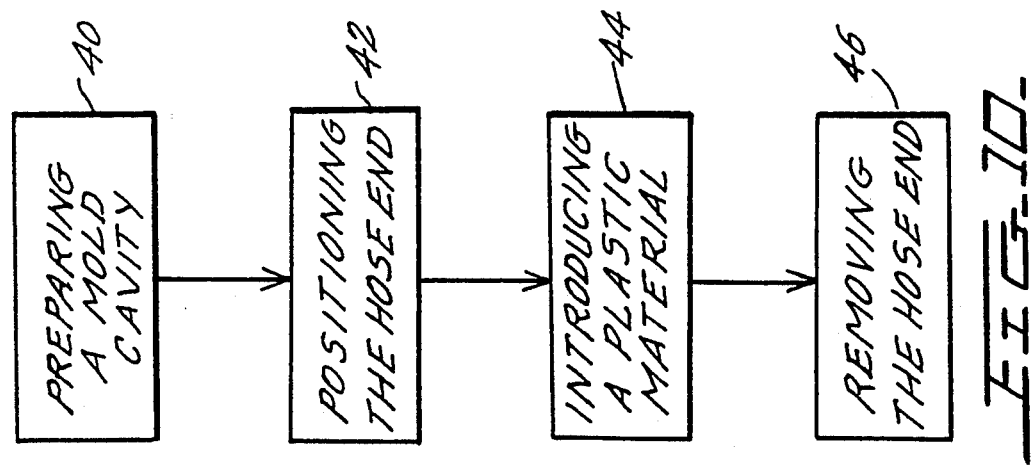
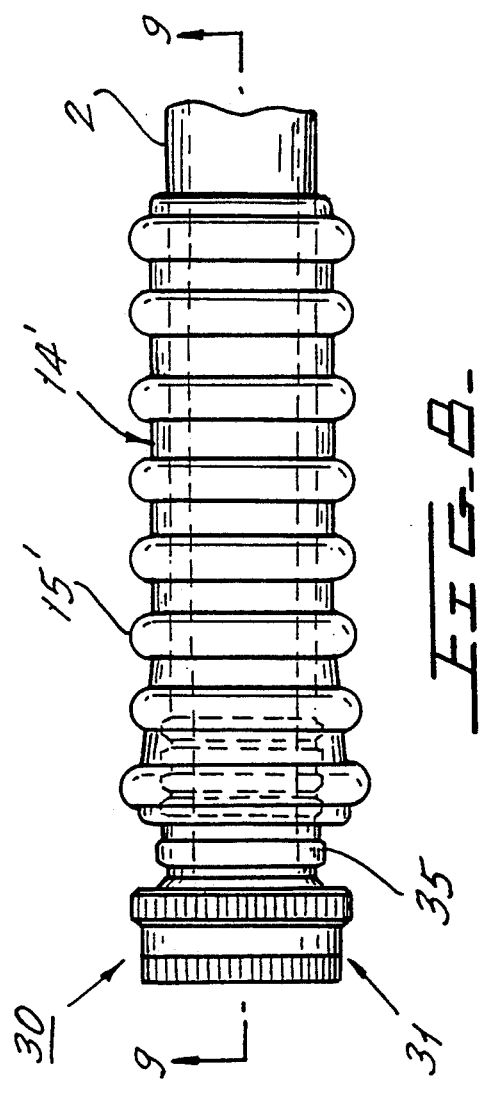
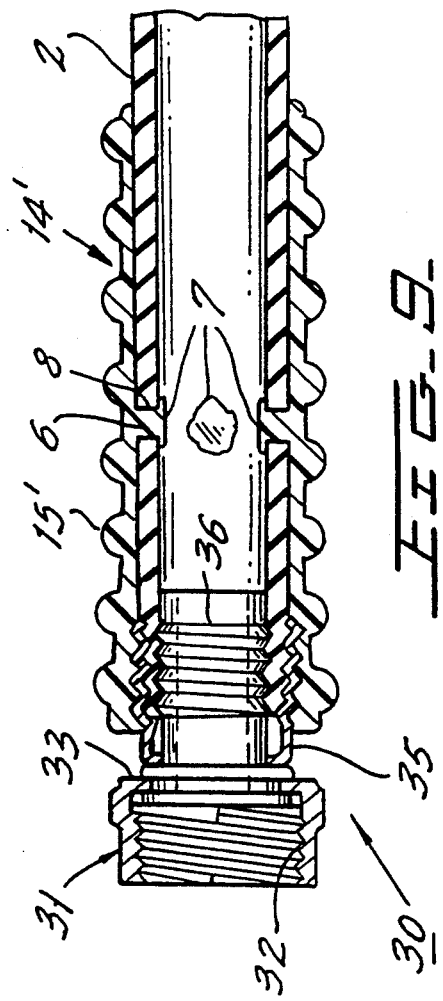

HOSE COUPLING WITH A STIFFENING SLEEVE

BACKGROUND OF THE INVENTION

1. Field of the Invention

The present invention relates to couplings for hoses, in particular garden hoses, and a method of manufacture thereof. The couplings, which are provided at one end of the hose, include a tubular sleeve portion of predetermined length to prevent the hose from kinking near the coupling when connected to a faucet.

2. Description of the Prior Art

Conventional garden hoses are usually extruded from rubber or plastic with reinforcing wires inside. At each end of the garden hose, there is provided either a male coupling or a female coupling. The couplings are typically made of a metal, such as brass. The female coupling includes a rotatable cup-like portion that is threaded on the inside, and the male coupling includes an externally threaded part.

The female coupling of the hose is attached to, for example, a water faucet by tightening the rotatable cup-like portion onto a male coupling on the faucet. On the other hand, the male coupling of the hose can be attached to, for example, a spray nozzle or sprinkler by tightening the externally threaded part into a female coupling on the spray nozzle or sprinkler.

There exist presently a number of problems in the garden hoses manufactured by existing technology having metal couplings attached at the ends. For example, the metal couplings are often accidentally crushed or disfigured thereby making connection with another coupling difficult. Metal couplings also corrode over time.

Problems also arise from the manual application of standard brass male or female couplings to a garden hose. The presently existing technology requires securing the coupling to the hose end with the use of a crimping tool. The attachment of the couplings to the hose end by crimping requires that the respective brass couplings include a short brass ferrule which is inserted into the bore of the hose. In the case of the female coupling, the threaded cup-like portion is rotatably mounted on the ferrule; in the case of the male coupling, the externally threaded portion is formed as one piece with the ferrule.

After insertion of the ferrule portion of the coupling into the bore of the hose, a second sleeve portion, also typically made of brass, is positioned on the outside surface of the hose so as to overlie the ferrule portion with the hose in between. The inner ferrule and the outer sleeve are then crimped with any suitable crimping tool whereby the coupling is attached to the hose end.

The crimping method, however, does not always provide a reliable, completely leak-proof connection between the hose end and the coupling; often the hose leaks at the join of the hose and the coupling. Moreover, since the length of the ferrule portion of a typical brass coupling, which is inserted into the bore of the hose, is less than 1", very little support is provided for the end of the hose. Therefore, the hose tends to twist when a person grips it to connect the female coupling to a faucet or the male coupling to a spray nozzle or sprinkler.

Another problem with conventional hoses is that they do not provide any form of stiffening or strain relief formed on the hose adjacent to the coupling to minimize bending and damage to the exterior of the hose when connected to a faucet. Accordingly, when the female coupling is connected to a faucet having its opening in either an upright or a horizontal position, the hose tends to "kink" at the junction of the hose and the female coupling. That is, it bends to the point that water flow is restricted. Moreover, when the hose is repeatedly pulled to the side it weakens and eventually begins to leak.

A related problem is the lack of a handle for gripping the hose near the coupling. When the hose is coupled or decoupled it is necessary to firmly grasp it. Moreover, a handle near the male coupling facilitates gripping the hose when used with a spray nozzle.

As one solution to the problem of kinking, at the female end, which is the end typically attached to a water supply faucet, it is known to supply a separate stiffening attachment that goes around the outside of the hose. At the present time, however, hoses are not manufactured with a stiffener on the hose, but rather the stiffening of the hose is obtained by a later added stiffening attachment. The stiffening attachment is usually inserted over the hose adjacent to the female coupling, and resists the undesired folding and kinking of the hose.

One example of a stiffening attachment is a metal spring that goes around the outside of the hose and is brought up to the coupling where it is lodged. This approach requires either the manufacture or purchase of the spring and its installation. Another design of a stiffening attachment is a separate plastic sleeve which is separately molded and then is applied onto the end of the hose. This plastic sleeve typically has an internal collar formed on the end which faces towards the coupling for gripping onto the coupling, but is removable by pulling on the sleeve.

It is also known to provide plastic sleeve stiffening attachments at both the female coupling end and the male coupling end of the hose. Usually, the male end is where the outlet for the water from the faucet is attached and the plastic stiffening attachment therefore serves the purpose of a handle for the user to grip the hose by.

These prior art stiffening attachments, however, do not completely solve the aforementioned problems with conventional garden hoses. Moreover, it is necessary to obtain the stiffening attachments separately and then install them on the hose.

Another solution to some of the aforementioned problems in conventional garden hoses is disclosed in U.S. Pat. No. 5,181,750. Male and female couplings are provided with a strain relief handle; the couplings include an internal projection portion, which is sized to fit in the bore of a hose, and are attached to the hose end by chemically bonding the internal projection portion to the hose whereby the strain relief portion encircles the hose adjacent to the coupling. However, there the couplings and the strain relief portion must be provided with specific shapes and chemically bonded to the hose, which is a complicated process.

SUMMARY OF THE INVENTION

According to one of its principal features, the present invention is directed at overcoming these various drawbacks by proposing a hose coupling for the end of a hose, comprising coupling means at one end of the hose, the coupling means projecting beyond the hose end for joining the hose coupling with a mateable coupling; and a generally tubular sleeve portion extending rearward from the coupling means along the outer surface of the hose, the generally tubular sleeve portion being molded onto the outer surface so as to prevent bending of the hose along a predetermined distance adjacent to the coupling means.

In one embodiment, a male coupling means is provided at the end of a hose. The male coupling means has threads formed on an outer surface thereon. The male coupling means may be molded onto the hose, and may advantageously form one piece with the tubular sleeve portion.

In another embodiment, a female coupling means is provided at the end of a hose, comprising a cup-like portion including threads formed on an inner surface therein; the cup-like portion may advantageously be rotatably mounted in an annular groove formed at one end of the tubular sleeve portion. The cup-like portion may be snap-fitted in the annular groove, and may advantageously be formed of the same material as the tubular sleeve portion.

In yet another embodiment, the respective coupling means include means for attaching the coupling means to one end of the hose, comprising an outer sleeve for fitting on the outside of the hose and an inner sleeve for fitting inside the bore of the hose. The female coupling means are rotatably mounted on one end of the inner sleeve and are attached at the hose end by crimping the hose between the outer sleeve and the inner sleeve. The male coupling means are formed in one piece with the inner sleeve, and are similarly attached at the hose end by crimping. The generally tubular portion may advantageously be molded onto the outer sleeve crimped onto one end of the hose.

In each embodiment, the tubular sleeve portion may advantageously further include a plurality of tabs formed on the inner surface of the tubular sleeve portion to further secure the tubular sleeve portion to the outer surface of the hose. The tabs extend from the inner surface of the tubular sleeve portion through a plurality of through holes formed in the wall of the hose into the hose to form retaining buttons along the inner surface of the hose.

The present invention also proposes a method of manufacturing a hose coupling for the end of a hose, comprising the steps of (a) preparing a mold cavity for receiving the hose end; (b) positioning the hose end in the mold cavity; (c) introducing a plastic material into the mold cavity thereby providing at least a generally tubular sleeve portion, extending rearward from the hose end, along a predetermined length of the hose; and (d) removing the hose end from the mold.

According to the method of the invention, a male or a female coupling may be provided, comprising coupling means at one end of the hose and the generally tubular sleeve portion extending rearward therefrom. The method may further include the step of crimping a male or a female coupling means at one end of the hose, preceding the step of positioning the hose end in the mold cavity. Alternatively, the tubular sleeve portion and the coupling means may be simultaneously molded onto the end of the hose.

The method of the invention may further include the step of forming a plurality of through holes in the wall of the hose along the predetermined length of the hose. The plastic material introduced into the mold cavity may advantageously be the same as the material of the hose, and may advantageously be injection molded onto the hose.

By the above method, the generally tubular sleeve portion, which comprises the stiffener, and the male or the female coupling means can be, for example, injection molded under pressure onto the end of a hose. The method includes obtaining a garden hose which is extruded in a standard way, a mold is provided with a cavity shaped to the desired shape of the hose end portion; the mold cavity is opened, the hose end inserted in it, and the cavity closed; the plastic material introduced to form the stiffener with or without the coupling; and the cavity is reopened and the hose is removed.

The drawbacks of the existing devices are thus done away with. This invention allows easier connection of the hose to water sources and sprays, provides water and air tightness at the point of connection between the coupling and the hose, prevents kinking, provides a handle, and is both durable and decorative.

This approach has a number of benefits. The molded couplings are cheaper to manufacture than metal couplings. There are fewer steps, such as having to install metal parts on the hose and then putting a metal spring over the hose.

Other features and advantages of the present invention will become apparent from the following description of the invention which refers to the accompanying drawings.

BRIEF DESCRIPTION OF THE DRAWINGS

FIG. 1 is a side view of a hose with a male coupling according to a first embodiment of the invention.

FIG. 2 is a sectional view of the male coupling in FIG. 1, along the line 2—2.

FIG. 3 is an end view of the male coupling in FIG. 1.

FIG. 8 is a side view of a hose with a female coupling according to a third embodiment of the invention.

FIG. 9 is a sectional view of the female coupling in FIG. 8 along the line 9—9.

FIG. 10 is a flow diagram showing the steps of the method for manufacturing the hose couplings according to the present invention.

DETAILED DESCRIPTION OF EMBODIMENTS OF THE INVENTION

Figure 4:
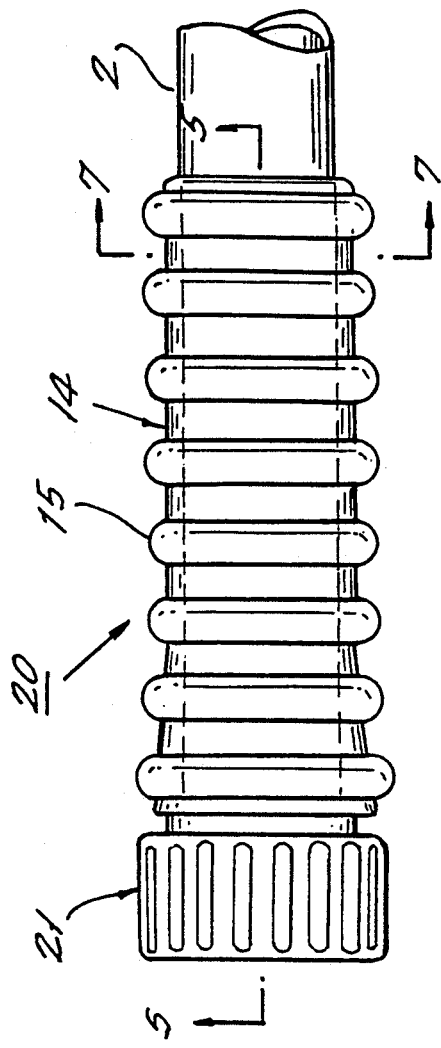
FIG. 4 is a side view of a hose with a female coupling according to a second embodiment of the invention.

FIG. 1 shows a male coupling 10, according to a first embodiment of the invention, attached at the end of a hose 2. The male coupling 10 includes a coupling portion 3 with threads 4 formed on an external surface thereon. As shown in FIG. 2, the coupling portion 3 of the male coupling 10 may advantageously be formed as one piece with a generally tubular sleeve portion 5 extending rearward along the outer surface of the hose 2.

The coupling portion 3 and the tubular sleeve portion 5 are preferably simultaneously molded onto the hose 2, as discussed in detail hereinbelow. The tubular sleeve portion 5 is bonded or laminated to the outer surface of the hose 2, and, therefore, securely attached to the hose 2.

Tabs 6 (shown in FIG. 2), which extend towards the interior of the hose 2, are preferably formed on the inside surface of the tubular sleeve portion 5. The tabs 6 extend through holes formed by punching through holes 8 in the outer surface of the hose 2. The tabs 6 spread out along the interior surface of the hose 2 to form corresponding buttons 7 and thereby further secure the tubular sleeve portion 5 to the outer surface of the hose 2.

The male coupling 10 may also advantageously include a suitable design or texture 9 (shown in FIG. 3) on the outer surface of the tubular sleeve portion 5 to improve the grip on the tubular sleeve portion 5. The dimensions of the sleeve portion 5 of the male coupling 10 may be chosen to provide suitable stiffening and a handle for gripping by the user.

Figure 5:
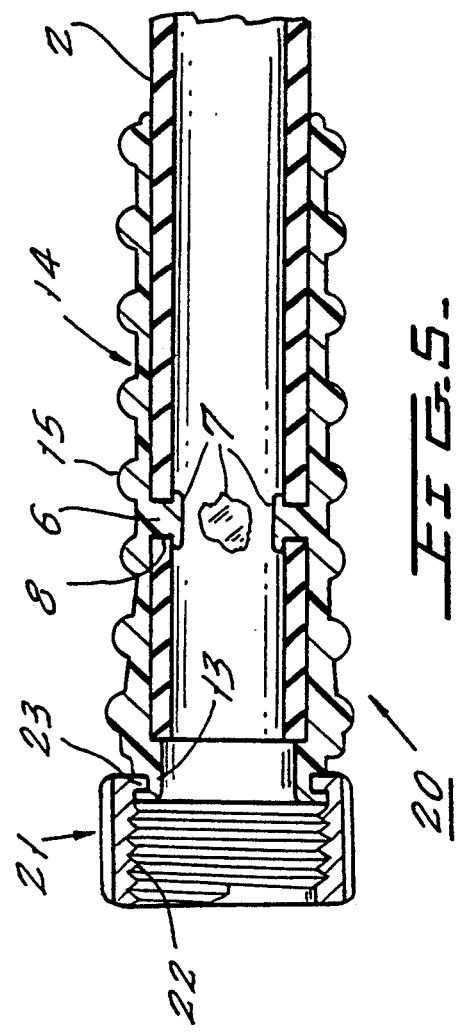
FIG. 5 is a sectional view of the female coupling in FIG. 4, along the line 5—5.
Figure 6:
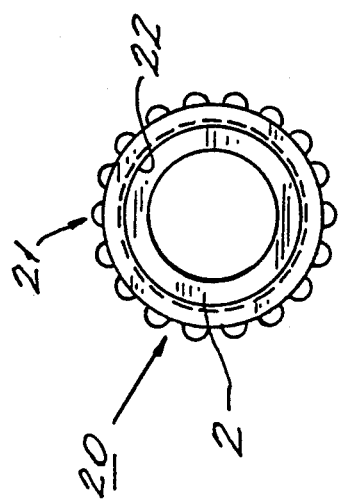
FIG. 6 is an end view of the female coupling in FIG. 4.
Figure 7:
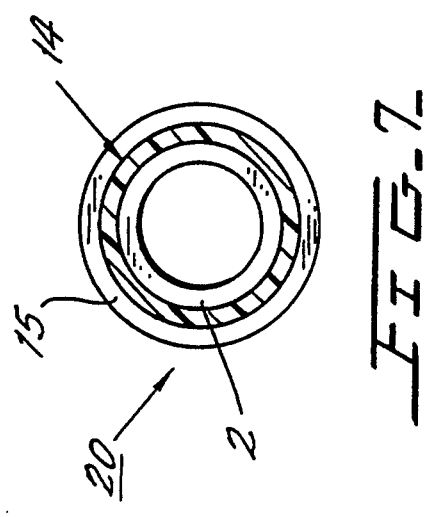
FIG. 7 is a sectional view of the female coupling in FIG. 4, along the line 7—7.

The female coupling 20, shown in FIG. 4, is a second embodiment of the invention. The female coupling 20 includes a rotatable cup-like coupling portion 21. The coupling portion 21 has threads 22 formed on an inner surface, as shown in FIG. 5. The coupling portion 21, of the female coupling 20, is rotatably mounted in an annular groove 23 that is formed at an end 13 of a generally tubular sleeve portion 14. The annular groove 23 enables the coupling portion 21 to be attached in a rotatable fashion at one end of the hose 2. In all other respects, the female coupling 20 may be formed identical to the male coupling 10. As in the male coupling 10, the female coupling 20 may include a design 15 (shown in FIG. 6) which is formed on the outer surface of the tubular sleeve portion 14 to improve the flexibility and the gripping surface of the tubular sleeve portion 14.

The rotatable coupling portion 21, of the female coupling 20, may advantageously be snap fitted into the annular groove 23 formed on the tubular sleeve portion 14. Alternatively, the rotatable coupling portion 21 may be molded with the sleeve portion 14 and subsequently separated therefrom so as to be rotatable in the annular groove 23. Methods for manufacturing these parts are well known in the art and, therefore, are not discussed in detail herein.

The female coupling portion 21 could be of metal, plastic, or any other suitable material. Accordingly, it is not necessary that the female coupling portion 21 and the tubular sleeve portion 14 be made of the same material. Preferably, the male coupling portion 3 and the female coupling portion 21 are made of the same material as the tubular sleeve portion 5, 14. The wall thickness and the length of the tubular sleeve portion 14 of the female coupling 20 may be of suitable dimensions that prevent the kinking or bending of the hose 2 adjacent to the coupling portion 21.

In another embodiment, shown in FIGS. 8 and 9, a female coupling 30 has a coupling portion 31 which is rotatably mounted in an annular groove 33 formed on one end of a ferrule 36. The coupling portion 31, shown in this embodiment as a female coupling, may then be attached at the end of the hose 2 by crimping the hose end between the ferrule 16 and an outer sleeve 35. Methods for crimping the inner ferrule 16 and the outer sleeve 35 to attach the coupling portion 31 to the hose 2 are well known in the art and, therefore, are not discussed in detail herein. Accordingly, any suitable method for crimping the inner ferrule 16 and the outer sleeve 35 may be used in the practice of the invention.

After crimping, the outer sleeve 35 may then be embedded in a generally tubular sleeve portion 14' when the tubular sleeve portion 14' is molded onto the hose 2. In this embodiment, the annular groove 23 (shown in FIG. 5), present in the second embodiment discussed above, may be dispensed with since crimping the inner ferrule 16 and the outer sleeve 35, and molding the tubular sleeve portion 14' onto the outer sleeve 35 serves the function of securing the coupling portion 31 at the end of the hose 2. By molding the tubular sleeve portion 14' onto the outer sleeve 35 the prior art problem of leakage at the join of the hose and the coupling is avoided since the tubular sleeve portion 14' acts as a seal. In this embodiment, the inner ferrule 36 and the outer sleeve 35 may be made of any suitable material, preferably metal.

Although this third embodiment is shown in the FIGURES and described in relation to a female coupling portion 31, it is not so limited and may be practiced with a male coupling portion 3 (shown in FIG. 1). Accordingly, when a male coupling portion 3 is used, the male coupling portion 3 may be formed in one piece with a ferrule 36. In all other respects, the male coupling may be similar to the female coupling 30 shown in FIG. 8 and 9.

The female coupling 20, 30 is attached to, for example, a faucet (not shown) by tightening the coupling portion 21, 31 onto the faucet. On the other hand, the male coupling 10 can be attached to, for example, a spray nozzle or sprinkler (not shown) by tightening the coupling portion 3 into the spray nozzle or sprinkler.

As shown in FIGS. 2 and 5, the male and female couplings 10, 20 are molded onto the outside of the hose 2. As shown in FIG. 9, the tubular sleeve portion 14' of the female coupling 30 is molded onto the outside of the hose 2. For example, the couplings 10, 20 and the tubular sleeve portion 14' may be injection molded directly onto the hose 2. The male and female couplings 10, 20 and the tubular sleeve portion 14' may advantageously be formed of a plastic compound material that is compatible with the material of the hose 2.

By molding the compatible plastic material directly onto the hose 2 at a temperature close to the melting point of the material of the hose 2 the couplings 10, 20 and the tubular sleeve portion 14' are firmly bound and laminated to the surface of the hose 2. In particular, the respective tubular sleeves 5, 14, 14' of the couplings 10, 20, 30 are laminated to the outer surface of the hose 2. As a result of this process, water seepage or leakage can be completely eliminated from the ends of the hose 2 having the couplings 10, 20, 30. Moreover, since both the coupling portions 3, 21, 31 and the tubular sleeve portions 5, 14, 14' are securely bound to the hose 2 there is little chance of the couplings 10, 20, 30 separating from the hose 2.

For example, in the case of a plastic hose 2, PVC (polyvinyl chloride) may be advantageously used as the compatible plastic material for the couplings 10, 20 and for the tubular sleeve part 14' of the coupling 30. In such a case, a temperature of just below 150 degrees Fahrenheit may be used. Accordingly, any suitable temperature or treatment process for the surface of the hose 2 known in the art may be used to securely bond the female and male couplings 10, 20, 30 to the hose 2. For example, an electronic heat seal process may be used to further laminate the tubular sleeve portions 5, 14, 14' to the outer surface of the hose 2.

The hose 2 may be further prepared before molding by punching two or more holes of any configuration through the outer surface of the hose 2 thereby forming a plurality of through holes 8. The through holes 8 may be of any suitable size, preferably around ¼". The through holes 8 that are punched through the outer wall of the hose 2 allow melted plastic material injected into the mold during the molding process to fill into the through holes 8. As a result, a plurality of tabs 6, attached to the inner surface of the sleeve portions 5, 14 and 14' are formed which extend towards the interior of the hose 2. Buttons 7 formed at the ends of the tabs 6 adhere to the inner surface of the hose 2, as shown in FIGS. 2, 5 and 9. Any suitable insert placed inside the bore of the hose 2 during the molding process prevents the melted plastic material injected into the mold from filling the inside of the hose 2. The insert also causes the ends of the tabs 6 to spread out to form the buttons 7 thereby gripping the inside surface of the hose 2. These tabs 6 and buttons 7 further secure the sleeve portions 5, 14 and 14' to the hose 2 and prevent the sleeve portions 5, 14 and 14' from twisting on the hose 2 or being pulled off from the hose 2.

Advantageously, the thickness of the tubular sleeve portions 5, 14 and 14' may be around 0.125"–225–. The female coupling 20, 30 may further have a corrugated texture or design 15, 15' for additional flexibility of the tubular sleeve portion 14, 14'; while the male coupling 10 may advantageously have a surface with a textured or design portion 9 for a more sturdy and comfortable grip.

The additional wall thickness of the tubular sleeve portion 14, 14' of the female coupling 20 prevents kinking near the coupling portion 21, 31 regardless of the faucet position. On the male coupling 10, the tubular sleeve portion 5 provides a sturdier and more comfortable hand grip.

In summary, the combination of a coupling portion 3, 21, 31 and a tubular sleeve portion 5, 14, 14' serving as a grip handle (for both male and female couplings) which are permanently molded onto a garden hose is most unique in both the product and its manufacturing process. Unprecedented in hose manufacturing, the male and female couplings 10, 20 are simultaneously manufactured and attached to the hose 2.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. A hose coupling attached to the end of a hose, the hose coupling comprising:

a coupling portion attached at one end of the hose, the coupling portion projecting beyond the hose end for joining the hose coupling with an external mateable coupling; and a generally tubular sleeve portion integrally formed with the coupling portion and extending rearward from the coupling portion along the outer surface of the hose, the sleeve portion being molded onto the outer surface and configured and dimensioned so as to provide an elongated handle for griping the hose coupling with the hand, when joining the hose coupling with the external mateable coupling, and to discourage bending of the hose along the length of the sleeve portion, the sleeve portion having an inner surface in contact with the outer surface of the hose;

the inner surface of the sleeve portion including a plurality of tabs, and a plurality of through holes being formed in the hose, the plurality of tabs extending from the inner surface of the sleeve portion through the plurality of through holes formed in the hose so as to secure the coupling to the hose, wherein the plurality of tabs are integrally formed by molding the sleeve portion onto the outer surface of the hose.

2. The hose coupling of claim 1, wherein the coupling portion includes threads formed on an outer surface thereof.

3. The hose coupling of claim 1, wherein the coupling portion is molded onto the hose.

4. The hose coupling of claim 3, wherein the coupling portion and the tubular sleeve portion are molded so as to form one piece.

5. The hose coupling of claim 1, further comprising buttons formed at ends of the tabs so as to be in contact with an inner surface of the hose to further secure the tubular sleeve portion to the hose.

* * * * *